United States Patent Office 3,263,540
Patented August 2, 1966

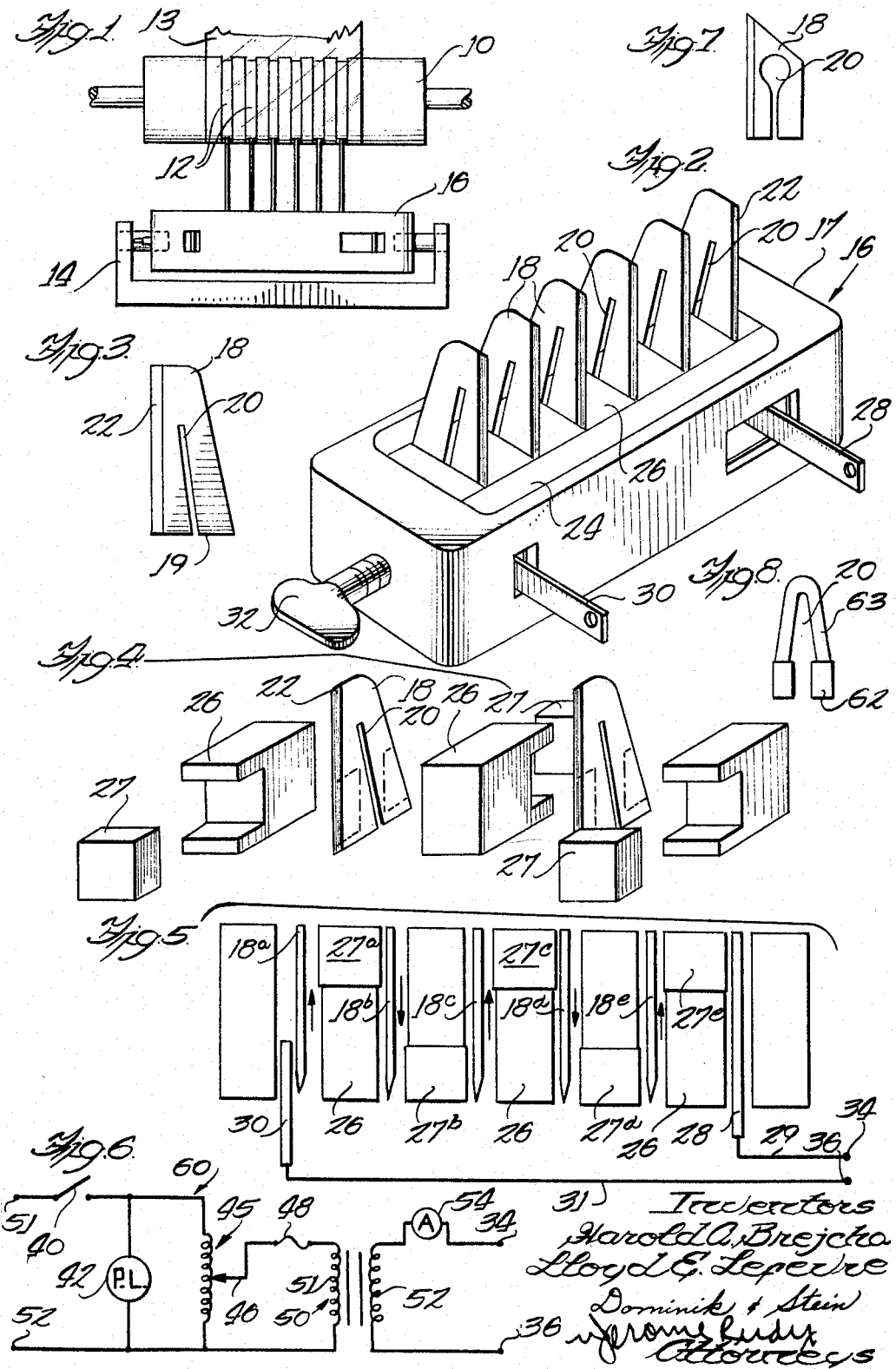

3,263,540
APPARATUS FOR SLITTING PLASTIC FILM
Lloyd E. Lefevre, Bay City, and Harold A. Brejcha, Midland Mich., assignors to The Dow Chemical Company, Midland, Mich., a corporation of Delaware
Filed May 27, 1964, Ser. No. 370,456
5 Claims. (Cl. 83—171)

This invention relates to the slitting of thermoplastic films, especially unoriented pigmented film, including vinyl films, saran films and blends or copolymers of polyolefin and other plastics.

In the production of ribbons, or tapes, used in certain types of fabric weaving, the ribbons are prepared by slitting a film into ribbons of desired width, following which the film is oriented. Slitting of the film is accomplished by means of knives or blades, and it is found that when slitting unoriented pigmented film, rapid dulling of the knives is experienced resulting in ribbons having unsmooth edges. The problem is especially acute when slitting unoriented polypropylene film.

It has been recognized for some time that the useful life of the knives or blades used for slitting thermoplastic film, especially pigmented polypropylene film, may be lengthened by heating the blades. In the past, this has usually been accomplished by mounting the blades in a base which contains a heating element for heating the base, with the blades being heated by the transfer of heat thereto by conduction. This method and apparatus is generally satisfactory, however, it is found that the temperature at which the base must be maintained in order to maintain the blades at the optimum temperature for long blade life adversely affects film properties. The effectiveness of this type of apparatus is therefore limited.

The effectiveness of the above-described type of apparatus is further limited by the fact that ultra-sharp blades are generally used. These blades become dull relatively fast and lose their efficiency. Furthermore since the blades are ultra-sharp, they must be handled with extreme care, for safety reasons.

It is therefore the object of this invention to provide an improved method and apparatus for slitting of thermoplastic films, including vinyl films, saran films and blend or copolymers of polyolefin and other plastics.

It is another object of this invention to provide an improved method and apparatus for slitting of unoriented pigmented film of the above-mentioned type.

It is another object of this invention to provide a new and improved method and apparatus for slitting unoriented pigmented film of the above-mentioned type wherein smooth edges will be produced on the slit film.

It is still another object of the invention to provide a new and improved method for slitting unoriented pigmented films, of the above-mentioned type whereby comparatively long and satisfactory service from the slitting knives is obtained.

It is a still further object to provide a new and improved method and apparatus for slitting thermoplastic films which does not adversely affect film properties.

It is a still further object of this invention to provide a new and improved apparatus for slitting thermoplastic films which does not employ ultra-sharp blades, so that the blades may be more easily and safely changed without the danger of cutting those who are changing the blades.

Other objects of the invention will in part be obvious and will in part appear hereinafter.

Briefly, the present invention provides the use of a plurality of blades 18 which are arranged to enter grooves 12 formed in a roll 10 about which a continuous sheet of thermoplastic film 13 is passed. The blades 18 are heated by causing an electric current to flow through the blades, rather than by conduction, as in the past.

The arrangement is unique in that the blades 18 are formed with a slit 20 therein which extends substantially through the blades 18 so that the path of least resistance to current flow is through the tips of each of the blades. An electric current flow through the blades 18 therefore causes the tips of the blades 18 to be heated.

A further advantage of the arrangement is that the blades 18 need not have ultra-sharp cutting edges 22. Slitting is accomplished by preheating the blades 18 before indexing them into the grooves 12, determining the quality of the slit and adjusting the temperature of the blades 18 to provide a quality slit.

The invention accordingly comprises the several steps and the relation of one or more of such steps with respect to each of the others and the apparatus embodying features of construction, combination of elements and arrangement of parts which are adapted to effect such steps, all as exemplified in the following detailed disclosure, and the scope of the invention will be indicted in the claims.

For a fuller understanding of the nature and objects of the invention, reference should be had to the following detailed description taken in connection with the accompanyng drawing in which:

FIGURE 1 is a broken side view of a slitter arrangement illustrative of an embodiment of the invention;

FIGURE 2 is a perspective view of the slitter blade arrangement;

FIGURE 3 is a side view of a slitter blade exemplary of the blades used in the slitter blade arrangement of FIG. 2;

FIGURE 4 is an exploded view showing the construction of the slitter blade arrangement exemplary of the invention;

FIGURE 5 is a top sectional view, illustrating the path of travel of the current from the power supply;

FIGURE 6 is a schematic diagram of the electrical circuitry which may be used to power the slitter blade arrangement of FIG. 1; and FIGURES 7 and 8 are side views of slitter blades of alternate construction which may be used with the invention.

Referring now to the drawing, the numeral 10 identifies a roll having a plurality of parallel arranged and equally spaced grooves 12 extending about the periphery, which roll is adapted to receive a flat film of thermoplastic material 13, passing around the lower portion of the roll as the film moves between other rollers (not shown). The grooves may all be of similar dimension.

A slitter blade assembly 16, positioned beneath the roll 10, includes a plurality of parallel arranged straight-edged blades 18, which are spaced by means of spacer blocks 26 to fit into grooves 12 of the roll 10 and by spacer block 24 so that the cutting edge of all of the blades are arranged in the same horizontal plane. A frame 17 is provided for maintaining the blades 18 and the spacer blocks 24 and 26 in assembled condition. The frame 17 of blade assembly 16 is pivotally mounted in a base 14 so that the blade assembly may be adjusted to index the tips of the blades 18 into the grooves 12 of the roll 10.

A winged set screw 32 is provided so that different size spacer blocks 26 may be used to vary the spacing between the blades so that different widths of film may be cut.

The blades 18 are metallic and, as may be best seen in FIG. 3, are substantially rectangular in shape, one edge thereof being sloped. A cutting edge 22 is formed on one edge thereof, and a slot 20 which extends from the bottom edge thereof substantially three-fourths of the way through the blade is formed therein.

The spacer blocks 26 are fabricated of non-conductive material, e.g. Transite, and are notched to receive a block 27 fabricated of a conductive material, e.g. brass. The conducting blocks 27 are slightly wider than the non-conducting spacer blocks 26 so that good electrical contact is made with the blades 18 when the apparatus is assembled, as shown in FIG. 2. The conducting blocks 27 are preferably alternated from side to side, as shown in FIG. 5, so that the spacing between, and pressure on, each blade 18 across the assembly is uniform.

Referring now to FIGS. 4 and 5, it may be noted that the terminals 28 and 30 are in contact with the block 27e and the blade 18a, respectively, and that the blade 18b is in contact with the blocks 27a and 27b, blade 18c is in contact with the blocks 27b and 27c, blade 18d is in contact with the blocks 27c and 27d and blade 18e is in contact with the blocks 27d and 27e. A closed electrical path is therefore provided through the blade assembly, and a power supply connected to the input terminals 34 and 36 (FIG. 5) with causes current to flow through the blade assembly in the directions indicated by the arrows.

With the arrangement shown, it may be noted that the current flows through each of the blades 18 in series. It may also be noted that this current flows through the tips of the blades since, as it is well known, current flow will follow the path of least resistance and the slot 20 formed in each of the blades 18 establishes a high resistance path across any part of the blades 18 other than the area of the blade above the slot 20. With this arrangement, localized heating of the tips of the blades 18 is provided, while the rest of the blade assembly 16, that is, the spacer blocks 24 and 26, the conducting blocks 27 and the frame 17, remains relatively cool. The blade assembly 16, therefore, is not heated as is generally true in the case of the prior art arrangements, thus the film properties are not adversely affected as it may be with these prior arrangements.

It is apparent from the preceding description that the blades 18 need not have a straight slot or gap, such as the slot 20, or any one given configuration, but may have slots, or gaps, which are custom shaped for the particular situation involved. Also, the blades 18 need not be shaped as described above nor fabricated of a single metal, but may be fabricated of a combination of metals to provide more efficient operation. Accordingly, the term "slot" when used is intended to be generic and to include straight slots, as shown in FIG. 3, as well as slots having any given configuration, such as that shown in FIGS. 7 and 8, which are capable of causing current to flow through a particular portion of a blade to cause localized heating.

In FIG. 8 is shown a blade 18 fabricated of a combination of metals. Blades of this type are more expensive, however, they may be more efficient for a particular application. The blade 18 in FIG. 8 has a base portion 62 which may be of a metal having high electrical conductivity, such as copper or silver, and a tip portion 63 which may be of a metal having, in comparison to the metal of the base portion, high electrical resistance, such as steel, and a slot 20 therein. With such an arrangement, localized heating of the tip portion 63 results, since it has a much higher resistance to current flow than the base portion 62.

In FIG. 6 is shown an arrangement which may be used to energize the blade assembly 16. A variable power supply 45, which may be a Powerstat Type 10B, has its input terminals 51 and 52 connected to a 115 volt source and its output terminals connected to a step-down transformer 50 arranged to provide approximately 0–6 volts output with 0–115 volts input. The output terminals of the output transformer are connected to the terminals 28 and 30 of the blade assembly 16. A switch 40 is provided to turn the power supply ON and OFF. An indicator lamp 42 may be connected across the line to indicate when the power supply is turned ON.

In operation, the film may be advanced over the grooved idler roll 10 in any suitable fashion. For example, it may be first passed under a chill roll for conditioning, thence over a herringbone idler to maintain flatness, thence under the grooved idler roll 10, thence around a snubber set which maintains tension around the grooved idler roll, thence onto a windup roll. After this string-up procedure is accomplished, the blades 18 are preheated before indexing them into the grooves 12 formed in the roll 10 to prevent damage to the unit, since the blades are relatively dull and the film is quite strong. Upon indexing the blades 18 into the grooves 12, the quality of the slit may then be determined and adjustments made for more or less heat by simply increasing or decreasing the current flow through the blades 18 by varying the variable power supply 45.

The power supply 45 may be calibrated for accurate selection and an ammeter 54 installed in the line to indicate the amount of current being applied to the blades. The reading on the ammeter 54 can be translated to indicate blade temperature.

As an example of the efficiency of the present invention, slitters used for slitting polypropylene film pigmented with 0.5% $TiO_2$, without heat on the blades, generally show signs of dulling after 25 minutes of running with 3 to 3½ hours maximum slitting time for the whole blade. The addition of heat (275–290° F.) to the blades will usually increase this time to 5 hours of slitting film, with a film speed through the slitter of approximately 35 f.p.m.

With the resistance-heated-blade slitter of the present invention, 27 hours of slitting was accomplished giving a very good slit edge at all times, while slitting film pigmented with 3% $TiO_2$, with a slitting speed of approximately 34.5 f.p.m. and the temperature of the slitter blades ranging from approximately 135 to 200° F.

The blades 18 are dull when compared to the type previously used as evidenced by the fact that without heat being added they will not slit film. Increase slitting time, or blade life, is increased since the blade temperature is merely increased as the blades become duller or as the film thickness varies. Furthermore, since only the tips of the blades 18 are heated the heat transfer from the blade assembly 16 has no effect on the film properties, even after 27 hours of continuous operation.

It will thus be seen that the objects set forth above, among those made apparent from the preceding description, are efficiently attained and, since certain changes may be made in carrying out the above method and in the construction set forth without departing from the scope of the invention, it is intended that all matter contained in the above description or shown in the accompanying drawing shall be interpreted as illustrative and not in a limiting sense.

It is also to be understood that the following claims are intended to cover all of the generic and specific features of the invention herein described, and all statements of the scope of the invention, which, as a matter of language might be said to fall therebetween.

Now that the invention has been described, what is claimed as new and desired to be secured by Letters Patent is:

1. Apparatus for slitting thermoplastic film comprising, a roll formed to provide a plurality of parallel arranged peripheral grooves, a blade assembly including a plurality of blades each having at least one cutting edge which is positioned for entering one of said grooves, a slot formed in each of said blades extending substantially through said blade forming a path of least resistance to curent flow through the tip of each of said blades, spacer support means for said plurality of blades and means for providing current flow through said blades, whereby the tips of said blades are heated.

2. Apparatus for slitting thermoplastic film comprising, a roll formed to provide a plurality of parallel arranged peripheral grooves, a blade assembly including a plurality of blades, each having at least one cutting edge and formed with a path of least resistance to current flow through the tip thereof, a non-conductive spacer block positioned between each of said blades to position said blades to enter respective ones of said grooves, conducting means in contact with each of said blades, and means connected to said conducting means for providing current flow through said conducting means and through said blades, whereby the tips of said blades are heated.

3. Apparatus for slitting thermoplastic film comprising, a roll formed to provide a plurality of parallel arranged peripheral grooves, a blade assembly including a plurality of blades positioned for entering said grooves, a non-conductive spacer block positioned between each of said blades, a conducting block positioned between each of said blades to contact said blades to connect said blades in series, a slit formed in each of said blades to provide a path of least resistance to current flow through the tip of said blades, whereby current flow through said blades is forced to flow through the tips thereof and said tip is heated to provide a smooth edge on the slit film.

4. Apparatus for slitting thermoplastic film comprising, a roll formed to provide a plurality of parallel arranged peripheral grooves, a blade assembly including a plurality of blades positioned for entering said grooves, each of said blades having a base portion of a metal having high electrical conductivity and a tip portion of a metal having, in comparison, high electrical resistance, at least one cutting edge and a slot formed therein extending from the base portion substantially through the tip portion of said blade to provide a path of least resistance to current flow through the tip of said blades, a non-conductive spacer block positioned between each of said blades, conducting means in contact with each of said blades, and means connected to said conducting means for providing current flow through said conducting means and through said blades, whereby the tips of said blades are heated.

5. Apparatus for slitting thermoplastic film comprising, a roll formed to provide a plurality of parallel arranged peripheral grooves, a blade assembly including a plurality of blades positioned for entering said grooves, said blades each having a base portion of a metal having high electrical conductivity and a tip portion of a metal having, in comparison, high electrical resistance, at least one cutting edge and a slot formed therein extending from the base portion substantially through the tip portion to provide a path of least resistance to current flow through the tip of said blades, a non-conductive spacer block positioned between each of said blades, a conducting block positioned between each of said blades to contact said blades to connect said blades in series, and means connected to said conducting means for providing current flow through said conducting means and through said blades, whereby the tips of said blades are heated.

References Cited by the Examiner

UNITED STATES PATENTS

| | | | |
|---|---|---|---|
| 773,563 | 11/1904 | Ginn | 83—435 X |
| 1,834,555 | 12/1931 | Tittle | 30—140 |
| 2,253,067 | 8/1941 | Draemann | 83—171 X |
| 2,421,125 | 5/1947 | Krebs | 83—140 |
| 2,437,295 | 3/1948 | Eastwood | 83—171 |
| 2,623,586 | 12/1952 | Volpi | 83—434 X |
| 2,701,835 | 2/1955 | Anton | 30—140 |
| 2,736,257 | 2/1956 | Stephenson | 83—171 X |
| 2,781,839 | 2/1957 | Brockrath et al. | 83—171 |
| 3,125,052 | 3/1964 | Spivey | 83—425 |

FOREIGN PATENTS

| | | |
|---|---|---|
| 301,372 | 10/1932 | Italy. |
| 229,846 | 3/1944 | Switzerland. |

ANDREW R. JUHASZ, *Primary Examiner.*

WILLIAM W. DYER, JR., *Examiner.*

J. M. MEISTER, *Assistant Examiner.*